US012739080B2

(12) United States Patent
Liu

(10) Patent No.: US 12,739,080 B2
(45) Date of Patent: Sep. 15, 2026

(54) METHOD AND APPARATUS FOR CONFIGURING DMRS PATTERNS, METHOD AND APPARATUS FOR GENERATING DMRSS, STORAGE MEDIUM

(71) Applicant: Beijing Xiaomi Mobile Software Co., Ltd., Beijing (CN)

(72) Inventor: Yang Liu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 375 days.

(21) Appl. No.: 18/555,044

(22) PCT Filed: Apr. 12, 2021

(86) PCT No.: PCT/CN2021/086719
§ 371 (c)(1),
(2) Date: Oct. 12, 2023

(87) PCT Pub. No.: WO2022/217444
PCT Pub. Date: Oct. 20, 2022

(65) Prior Publication Data
US 2024/0214151 A1 Jun. 27, 2024

(51) Int. Cl.
*H04L 5/00* (2006.01)

(52) U.S. Cl.
CPC .................................. *H04L 5/0051* (2013.01)

(58) Field of Classification Search
CPC .......................... H04W 72/0446; H04W 72/23
See application file for complete search history.

(56) References Cited

U.S. PATENT DOCUMENTS

2018/0324760 A1 11/2018 Yuk et al.
2019/0068308 A1 2/2019 Shin et al.
(Continued)

FOREIGN PATENT DOCUMENTS

CN 108024342 A 5/2018
CN 108989003 A 12/2018
(Continued)

OTHER PUBLICATIONS

International Search Report Issued Dec. 24, 2021, in PCT/CN2021/086719, filed on Apr. 12, 2021, with English Translation, therein, 4 pages.
(Continued)

*Primary Examiner* — Shukri Taha
(74) *Attorney, Agent, or Firm* — Oblon, McClelland, Maier & Neustadt, L.L.P.

(57) ABSTRACT

The present disclosure provides a method and apparatus for configuring DMRS patterns, a method and apparatus for generating DMRSs, a storage medium. The method for configuring DMRS patterns can include configuring, for a terminal, a maximum number of symbols that DMRSs are allowed to occupy within a preset time window, the preset time window comprising a plurality of transmission occasions of physical channels used for DMRS bundling. The present disclosure can not only reduce the density of DMRSs so as to provide more locations for data transmission, but also allow the DMRSs to be distributed as evenly as possible on different physical channel transmission occasions, thereby helping to maintain power consistency and phase continuity, and helping to improve channel estimation performance.

17 Claims, 9 Drawing Sheets

(56) References Cited

U.S. PATENT DOCUMENTS

| | | | | |
|---|---|---|---|---|
| 2020/0266964 | A1* | 8/2020 | Kang | H04W 72/23 |
| 2022/0045814 | A1* | 2/2022 | Xu | H04L 5/0078 |
| 2022/0224475 | A1* | 7/2022 | Taherzadeh Boroujeni | H04L 5/0053 |
| 2024/0015707 | A1* | 1/2024 | Ly | H04L 5/0078 |
| 2024/0114490 | A1* | 4/2024 | Bhamri | H04L 5/0012 |

FOREIGN PATENT DOCUMENTS

| | | | |
|---|---|---|---|
| CN | 109150426 | A | 1/2019 |
| CN | 111869298 | A | 10/2020 |
| CN | 111919415 | A | 11/2020 |
| CN | 112385252 | A | 2/2021 |
| TW | 202110249 | A | 3/2021 |
| WO | WO-2020/091579 | A1 | 5/2020 |

OTHER PUBLICATIONS

Moderator (China Telecom), “[104-e-NR-CovEnh-03] Summary of email discussion on joint channel estimation for PUSCH”, 3GPP TSG RAN WG1 Meeting #104-e, R1-2102161, 2021, 92 pages.

Combined Chinese Office Action and Search Report issued May 22, 2025 in Chinese Patent Application No. 202180000765.3 (with English translation), 21 pages.

Chinese Notice of Allowance issued Jan. 26, 2026 in Chinese Patent Application No. 202180000765.3 (with English translation), 5 pages.

* cited by examiner

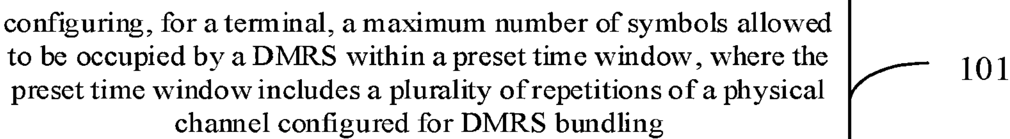
Fig. 1
configuring, through a target signaling for the terminal, a value corresponding to the maximum number of symbols
201
Fig. 2
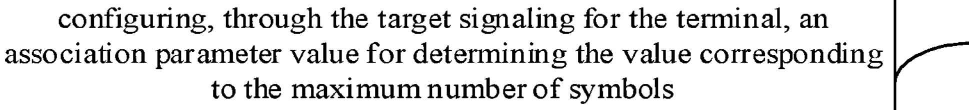
Fig. 3
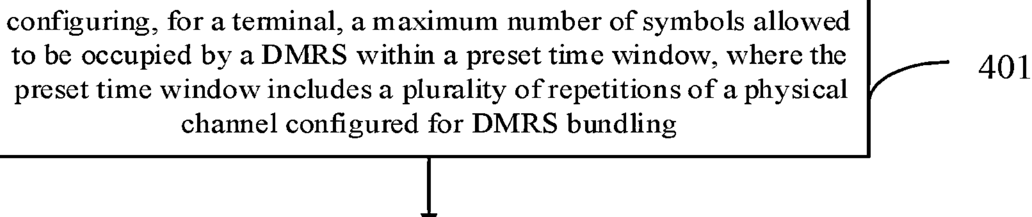
configuring, for the terminal, an indication granularity corresponding to the maximum number of symbols
402
Fig. 4

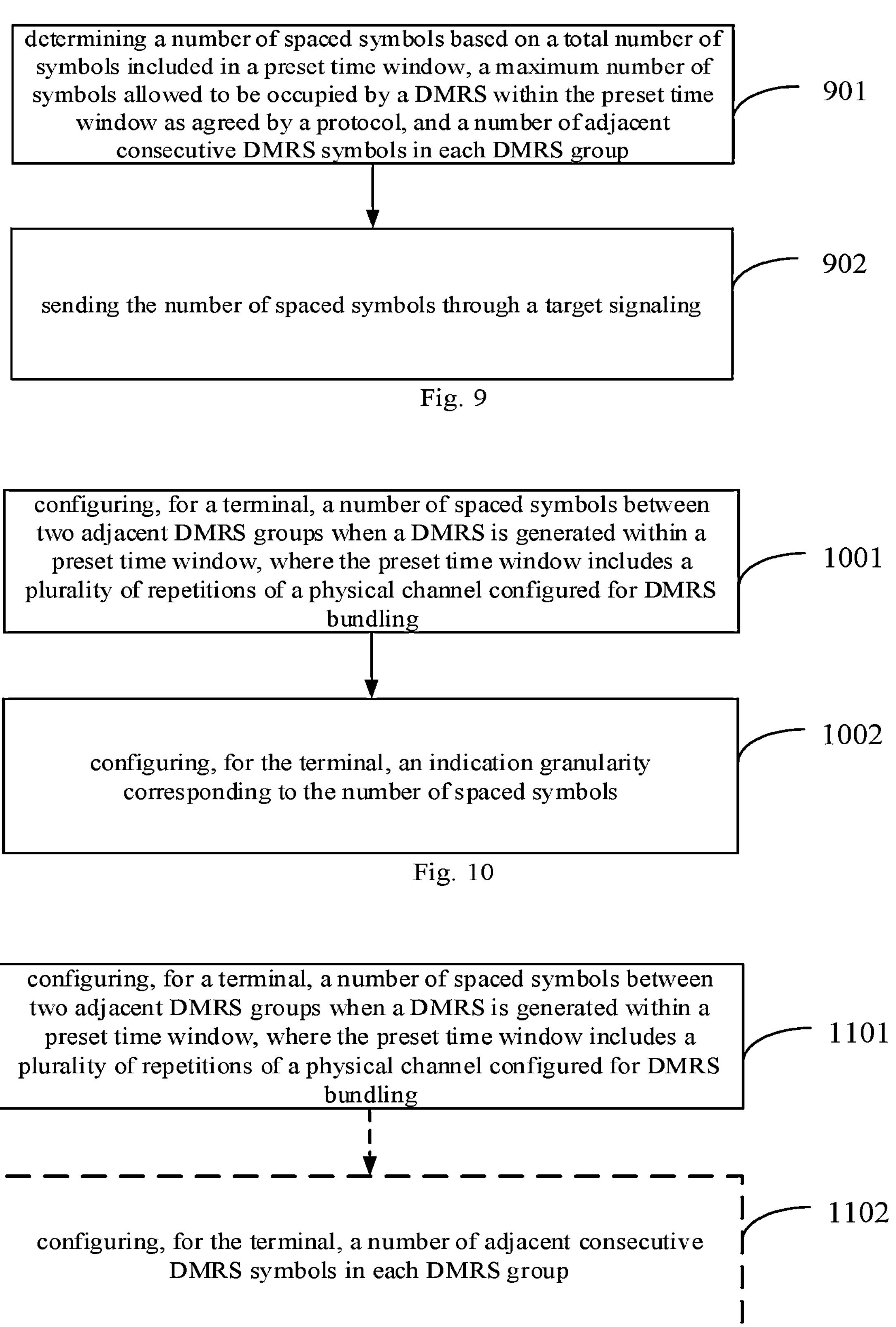
determining a number of spaced symbols based on a total number of symbols included in a preset time window, a maximum number of symbols allowed to be occupied by a DMRS within the preset time window as agreed by a protocol, and a number of adjacent consecutive DMRS symbols in each DMRS group
901
sending the number of spaced symbols through a target signaling
902
Fig. 9
configuring, for a terminal, a number of spaced symbols between two adjacent DMRS groups when a DMRS is generated within a preset time window, where the preset time window includes a plurality of repetitions of a physical channel configured for DMRS bundling
1001
configuring, for the terminal, an indication granularity corresponding to the number of spaced symbols
1002
Fig. 10
configuring, for a terminal, a number of spaced symbols between two adjacent DMRS groups when a DMRS is generated within a preset time window, where the preset time window includes a plurality of repetitions of a physical channel configured for DMRS bundling
1101
configuring, for the terminal, a number of adjacent consecutive DMRS symbols in each DMRS group
1102
Fig. 11

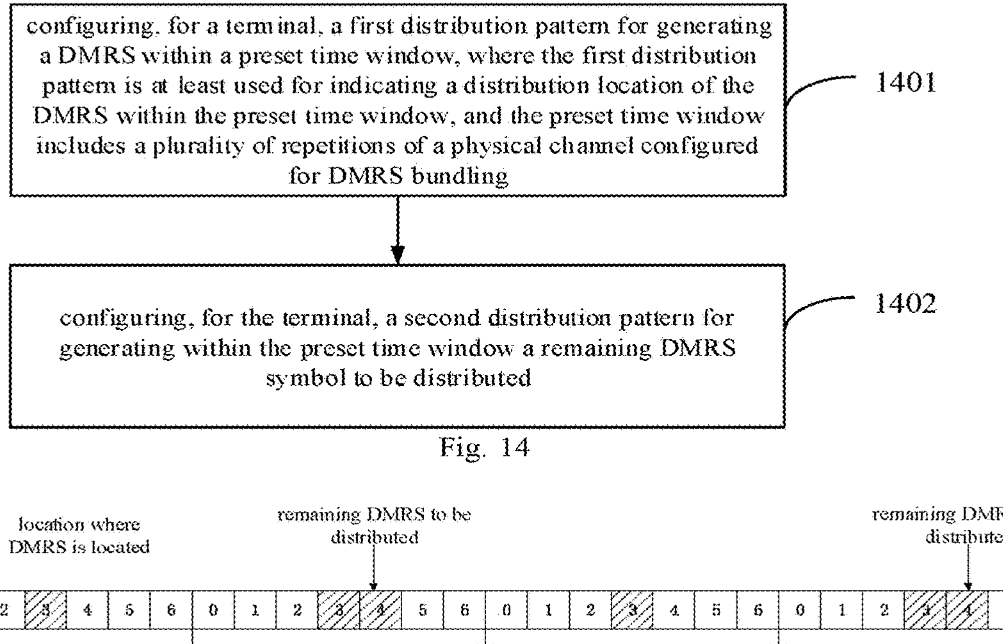
Fig. 14
Fig. 15A
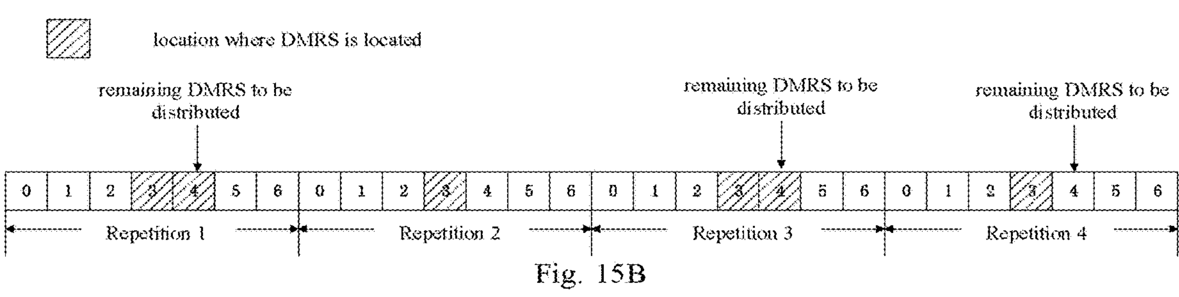
Fig. 15B
generating a DMRS conforming to a first distribution pattern within a preset time window based on a maximum number of symbols allowed to be occupied by the DMRS within the preset time window, and the first distribution pattern for generating the DMRS within the preset time window
1601
Fig. 16

2600

2622
processing component wireless transmitting/ receiving component
2624 antenna component
2626

METHOD AND APPARATUS FOR CONFIGURING DMRS PATTERNS, METHOD AND APPARATUS FOR GENERATING DMRSS, STORAGE MEDIUM

CROSS REFERENCE TO RELATED APPLICATION(S)

The present application is a U.S. National Stage of International Application No. PCT/CN2021/086719 filed on Apr. 12, 2021, the content of which is incorporated herein by reference in its entirety for all purposes.

BACKGROUND

Technical Field

The present disclosure relates to the field of communications, and in particular to a method and apparatus for configuring a DMRS pattern, a method and apparatus for generating a DMRS, and a storage medium.

Description of the Related Art

3rd Generation Partnership Project (3GPP) Release17 (R17) proposed a joint channel to enhance a Physical Uplink Shared Channel (PUSCH) coverage. In addition, Demodulation Reference Signal (DMRS) bundling cross a Physical Uplink Control Channel (PUCCH) is considered to be a potential solution for enhancing the PUCCH coverage.

Both solutions specify a bundling granularity of a DMRS symbol, and require power consistency and phase continuity to be ensured within a certain time window. This requires that the power of a terminal cannot change and the phase must be continuous within the bundling time window. In addition, a DMRS pattern on each slot or transmission occasion may also affect the joint channel estimation performance.

In the DMRS-bundled joint channel estimation solution, if a relatively small number of DMRS patterns are used, more resources can be saved for data transmission, which reduces the data transmission code rate. However, if a design goal is the DMRS uniform distribution, both the locations and the number of DMRSs are required to be uniform for achieving the best channel estimation performance.

SUMMARY

In order to overcome problems in the related arts, embodiments of the present disclosure provide a method and apparatus for configuring a DMRS pattern, and a method and apparatus for generating a DMRS.

According to a first aspect of embodiments of the present disclosure, there is provided a method for configuring a DMRS pattern, which is performed by a base station, and the method includes configuring, for a terminal, a maximum number of symbols allowed to be occupied by a DMRS within a preset time window, and/or a number of symbol intervals between adjacent DMRS groups when the DMRS is generated within the preset time window; where the preset time window includes a plurality of transmission occasions of a physical channel configured for DMRS bundling.

According to a second aspect of embodiments of the present disclosure, there is provided a method for generating a DMRS, which is performed by a terminal, and the method includes generating, within the preset time window; DMRSs based on a maximum number of symbols allowed to be occupied by the DMRS within the preset time window, where the DMRSs are distributed at intervals according to a number of symbol intervals between adjacent DMRS groups within the preset time window and satisfy the number of consecutive DMRS symbols in each DMRS group, where the number of symbol intervals between adjacent DMRS groups within the preset time window is determined based on the maximum number of symbols allowed to be occupied by the DMRS within the preset time window, a total number of symbols comprised in the preset time window, and the number of consecutive DMRS symbols in each DMRS group, or configured by a base station for the terminal, and the preset time window comprises a plurality of transmission occasions of a physical channel configured for DMRS bundling.

According to a third aspect of embodiments of the present disclosure, there is provided an apparatus for configuring a DMRS pattern, including a processor and a memory that configured to store instructions executable by the processor.

The processor is configured to perform the method for configuring a DMRS pattern in the first aspect as described above.

According to a fourth aspect of embodiments of the present disclosure, there is provided an apparatus for generating a DMRS, including a processor and a memory that is configured to store instructions executable by the processor.

The processor is configured to perform the method for generating a DMRS in the second aspect as described above.

It should be noted that the above general description and the following detailed description are merely exemplary and explanatory, and should not be construed as limiting of the present disclosure.

BRIEF DESCRIPTION OF THE DRAWINGS

The accompanying drawings, which are incorporated in and constitute a part of this specification, illustrate embodiments consistent with the present disclosure and together with the description serve to explain principles of the present disclosure.

FIG. 1 illustrates a schematic flowchart of a method for configuring a DMRS pattern according to an embodiment.

FIG. 2 illustrates a schematic flowchart of another method for configuring a DMRS pattern according to an embodiment.

FIG. 3 illustrates a schematic flowchart of another method for configuring a DMRS pattern according to an embodiment.

FIG. 4 illustrates a schematic flowchart of another method for configuring a DMRS pattern according to an embodiment.

FIG. 9 illustrates a schematic flowchart of another method for configuring a DMRS pattern according to an embodiment.

FIG. 10 illustrates a schematic flowchart of another method for configuring a DMRS pattern according to an embodiment.

FIG. 11 illustrates a schematic flowchart of another method for configuring a DMRS pattern according to an embodiment.

FIG. 14 illustrates a schematic flowchart of another method for configuring a DMRS pattern according to an embodiment.

FIGS. 15A to 15B illustrate schematic diagrams of scenarios for generating a DMRS according to an embodiment.

FIG. 16 illustrates a schematic flowchart of another method for generating a DMRS according to an embodiment.

DETAILED DESCRIPTION OF THE PREFERRED EMBODIMENTS

Figures 5, 6, 7, 8:
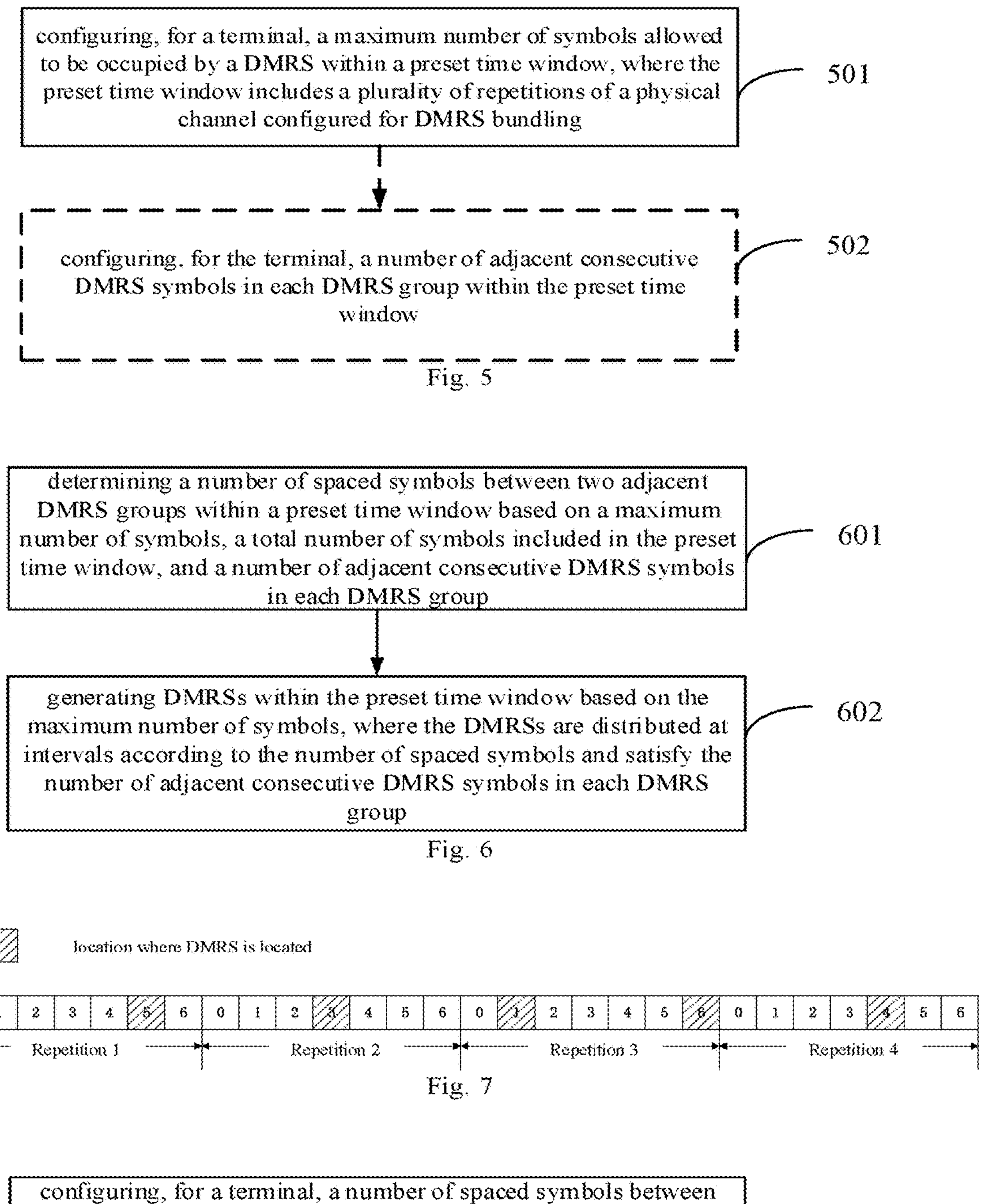
FIG. 5 illustrates a schematic flowchart of another method for configuring a DMRS pattern according to an embodiment.
FIG. 6 illustrates a schematic flowchart of a method for generating a DMRS according to an embodiment.
FIG. 7 illustrates a schematic diagram of a scenario for generating a DMRS according to an embodiment.
FIG. 8 illustrates a schematic flowchart of another method for configuring a DMRS pattern according to an embodiment.

Reference will now be made in detail to illustrative embodiments, examples of which are illustrated in the drawings. The following description refers to the drawings, in which the same numbers in different drawings represent the same or similar elements, unless otherwise represented. The implementations set forth in the following description of illustrative embodiments do not represent all implementations consistent with the present disclosure. Instead, they are merely examples of apparatuses and methods consistent with some aspects related to the present disclosure as recited in the appended claims.

The terms used in the present disclosure are merely for the purpose of describing particular embodiments and are not intended to limit the present disclosure. As used in the present disclosure and the appended claims, the singular forms “a”, “said”, and “the” are intended to include the plural forms as well, unless the context clearly indicates otherwise. It should also be understood that the term “and/or” as used herein refers to and includes any or all possible combinations of one or more of the associated items as listed.

It should be understood that, although the terms first, second, third, etc. may be used the present disclosure to describe various information, such information should not be limited to these terms. These terms are only used to distinguish the same type of information from each other. For example, without departing from the scope of the present disclosure, first information may also be referred to as second information, and similarly, the second information may also be referred to as the first information. Depending on the context, the word “if” as used herein may be interpreted as “upon” or “when” or “in response to determination”.

The present disclosure provides two solutions for configuring a DMRS pattern and generating a DMRS in the following. These two solutions may be applied to any scenario that requires DMRS bundling, which, in some examples, includes, but is not limited to, a scenario in which joint channel estimation is performed through the DMRS bundling.

The technical solutions provided by embodiments of the present disclosure may include the following beneficial effects.

In embodiments of the present disclosure, not only the DMRS density can be reduced to provide more locations for data transmission, but also the DMRSs can be distributed as evenly as possible on different physical channel transmission occasions. This facilitates to maintain the power consistency and the phase continuity, and facilitates to improve the channel estimation performance.

In a first solution, the maximum number of symbols allowed to be occupied by the DMRS within the preset time window is agreed in a protocol or configured by a base station. The number of symbol intervals between adjacent DMRS groups is determined by the base station or a terminal. The DMRSs that are distributed at intervals are generated by the terminal according to the number of symbol intervals.

The first solution may further include four cases in the following.

In a first case, the base station configures the maximum number M of symbols for the terminal, and the terminal needs to calculate the number L of symbol intervals by itself.

In a second case, the maximum number M of symbols may be agreed in the protocol, and the terminal needs to calculate the number L of symbol intervals.

In a third case, the maximum number M of symbols may be agreed in the protocol, and the base station determines the number L of symbol intervals and then indicates the number L to the terminal.

In a fourth case, the base station configures the maximum number M of symbols and the number L of symbol intervals for the terminal.

The above four cases are introduced respectively below.

In the first case, the base station configures the maximum number M of symbols for the terminal, and the terminal needs to calculate the number L of symbol intervals by itself.

Embodiments of the present disclosure provide a method for configuring a DMRS pattern. Reference may be made to FIG. 1, which illustrates a flowchart of a method for configuring a DMRS pattern according to an embodiment. The method may be performed by a base station, and may include the following step 101.

In the step 101, the maximum number of symbols allowed to be occupied by a DMRS within a preset time window is configured for a terminal, where the preset time window includes a plurality of transmission occasions of a physical channel configured for DMRS bundling.

In embodiments of the present disclosure, the physical channel includes but is not limited to any of: a PUSCH, a Physical Uplink Control Channel (PUCCH), a Physical Downlink Shared Channel (PDSCH), and a Physical Downlink Control Channel (PDCCH). The plurality of transmission occasions may be used for indicating a plurality of repeated transmission occasions corresponding to the same physical channel when physical channel enhancement is performed.

In the above embodiments, the base station may configure the maximum number of symbols for the terminal, and the terminal itself determines the number of symbol intervals between adjacent DMRS groups when the DMRS is generated, thereby generating the DMRS that satisfies the spacing distribution. In this case, not only the DMRS density can be reduced to provide more locations for data transmission, but also the DMRSs can be distributed as evenly as possible on different physical channel transmission occasions. This facilitates to maintain the power consistency and the phase continuity, and facilitates to improve the channel estimation performance.

In some embodiments, the base station may configure the maximum number of symbols for the terminal through a signaling, and the signaling includes, but is not limited to, a physical layer signaling or a higher layer signaling.

Specifically, the base station may directly configure, for the terminal, the value of the maximum number of symbols by means of explicit indication.

Reference may be made to FIG. 2, which illustrates a flowchart of a method for configuring a DMRS pattern according to an embodiment. The method may be performed by a base station, and may include the following step 201.

In the step 201, the value corresponding to the maximum number of symbols is configured for a terminal through a signaling.

In embodiments of the present disclosure, the signaling includes, but is not limited to, at least one of: a Radio Resource Control (RRC) signaling, a Media Access Control-Control Element (MAC-CE) signaling, and Downlink Control Information (DCI).

In a possible implementation, the base station may send the value of the maximum number of symbols to the terminal by reusing the existing information field of the signaling.

In another possible implementation, the base station may carry the value of the maximum number of symbols through the newly added information field in the signaling, thereby sending the value of the maximum number of symbols to the terminal.

In the above embodiments, the base station may send the value of the maximum number of symbols to the terminal through the signaling by means of explicit indication, which is simple to implement and has high availability.

Alternatively, the base station may also configure, for the terminal, an association parameter value by means of implicit indication for determining the value corresponding to the maximum number of symbols.

Reference may be made to FIG. 3, which illustrates a flowchart of a method for configuring a DMRS pattern according to an embodiment. The method may be performed by a base station, and may include the following step 301.

In the step 301, an association parameter value for determining the value corresponding to the maximum number of symbols is configured for a terminal through a signaling.

In embodiments of the present disclosure, the signaling includes, but is not limited to, at least one of: a RRC signaling, a MAC CE signaling, and DCI.

The association parameter value includes, but is not limited to, at least one of: the number of the plurality of transmission occasions included in the preset time window; the total number of symbols included in the preset time window; and the total number of slots included in the preset time window.

In the above embodiments, the base station may implicitly configure the association parameter value for the terminal. Subsequently, the terminal side may calculate the maximum number of symbols based on the association parameter value configured by the base station, which is simple to implement and has high availability.

In some embodiments, reference may be made to FIG. 4, which illustrates a flowchart of a method for configuring a DMRS pattern according to an embodiment. The method may be performed by a base station, and may include the following steps 401 and 402.

In the step 401, the maximum number of symbols allowed to be occupied by a DMRS within a preset time window is configured for the terminal, where the preset time window includes a plurality of transmission occasions of a physical channel configured for DMRS bundling.

In the step 402, an indication granularity corresponding to the maximum number of symbols is configured for the terminal.

In embodiments of the present disclosure, while configuring, for the terminal, the maximum number of symbols through the signaling, the base station may also configure, for the terminal, the indication granularity corresponding to the maximum number of symbols through the signaling. The indication granularity corresponding to the maximum number of symbols refers to a correspondence between the maximum number of symbols and at least one of the terminal, a terminal service type, a physical channel format, and a preset time window size.

In some examples, the indication granularity corresponding to the maximum number of symbols may include, but is not limited to, at least one of: all terminals in a cell, different terminal groups, a specified terminal, different Physical Uplink Control Channel (PUCCH) formats of the specified terminal, different service types of the specified terminal, and different preset time window sizes of the specified terminal.

For example, if the indication granularity corresponding to the maximum number of symbols refers to all terminals in the cell, the base station configures the maximum number M1 of symbols for the terminal, where M1 is directed to all terminals in the cell. For another example, if the indication granularity corresponding to the maximum number of symbols refers to the specified terminal, the maximum number M2 of symbols configured by the base station is only directed to the specified terminal, and the maximum number M3 of symbols for other terminals may be different from M1. The meanings of other indication granularities are similar to the above examples, and will not be described again here.

In the above embodiments, the base station may also configure the indication granularity corresponding to the maximum number of symbols for the terminal, while configuring the maximum number of symbols for the terminal, which is more conducive to improving the channel estimation performance.

In some embodiments, reference may be made to FIG. 5, which illustrates a flowchart of a method for configuring a DMRS pattern according to an embodiment. The method may be performed by a base station, and may include the following steps 501 and 502.

In the step 501, the maximum number of symbols allowed to be occupied by a DMRS within a preset time window is configured for the terminal, where the preset time window includes a plurality of transmission occasions of a physical channel configured for DMRS bundling.

In some examples, in the step 502, the number of consecutive DMRS symbols in each DMRS group within the preset time window is configured for the terminal.

In a possible implementation, the number of consecutive DMRS symbols, configured by the base station for the terminal, in each DMRS group within the preset time window may be one or two, or more, which is not limited by the present disclosure.

In another possible implementation, the step 502 may be omitted, and the terminal side defaults that the number of consecutive DMRS symbols in each DMRS group within the preset time window is one.

In the above embodiments, the base station may also configure, for the terminal, the number of consecutive DMRS symbols in each DMRS group, while configuring, for the terminal, the maximum number of symbols allowed to be occupied by the DMRS within the preset time window. If the base station does not configure the number of consecutive DMRS symbols in each DMRS group, the terminal side may use the default value. This also achieves the purpose of distributing the DMRSs as evenly as possible on different physical channel transmission occasions, thereby helping to maintain the power consistency and the phase continuity, and helping to improve the channel estimation performance. In a case that the base station configures the maximum number of symbols for the terminal, the present disclosure further provides a corresponding solution for generating a DMRS at the terminal side.

Reference may be made to FIG. 6, which illustrates a flowchart of a method for generating a DMRS according to an embodiment. The method may be performed by a terminal, and may include the following steps 601 and 602.

In the step 601, based on the maximum number of symbols, the total number of symbols included in the preset time window, and the number of consecutive DMRS symbols in each DMRS group, the number of symbol intervals between adjacent DMRS groups within the preset time window is determined.

In embodiments of the present disclosure, the maximum number of symbols is configured by a base station for the terminal.

In a possible implementation, the terminal directly receives the value of the maximum number of symbols, which value is configured by the base station by means of explicit indication.

In another possible implementation, if the base station sends an association parameter value in an implicit manner, the terminal may calculate the value corresponding to the maximum number of symbols based on the received association parameter value and a predetermined correspondence between the association information and the value of the maximum number of symbols. The association parameter value includes, but is not limited to, at least one of: the number of a plurality of transmission occasions included in the preset time window; the total number of symbols included in the preset time window, and the total number of slots included in the preset time window.

For example, if the association parameter value is the total number of symbols included in the preset time window; the total number of symbols is 32, and the predetermined correspondence indicates that a ratio between the total number of symbols and the value of the maximum number of symbols is 8:1, then the terminal may determine that the value of the maximum number of symbols is 4.

In embodiments of the present disclosure, the terminal may calculate the total number of symbols according to a bundling granularity N, indicated by the base station, of DMRS corresponding to the preset time window. The bundling granularity of DMRS means bundling N transmission occasions of the physical channel.

For example, if the terminal has determined that each transmission occasion occupies 7 consecutive symbols in time domain, and the bundling granularity of DMRS is 4, then the terminal may calculate that the total number of symbols is 4*7=28.

In embodiments of the present disclosure, the number of DMRS symbols in the DMRS group may be configured by the base station for the terminal, or the terminal determines by default that the number of consecutive DMRS symbols in each DMRS group is 1.

In a possible implementation, if the number of consecutive DMRS symbols in each DMRS group configured by the base station for the terminal is 1, or the terminal determines by default that the number of consecutive DMRS symbols in each DMRS group is 1, the terminal may calculate the number L of symbol intervals according to the following formula:

$$L = \text{Total number of symbols} / M \quad \text{Formula 1}$$

where M refers to the maximum number of symbols.

For example, if the base station configures M being 4 for the terminal, each transmission occasion occupies 7 consecutive symbols in time domain, and the bundling granularity of DMRS is 4, then the number L of symbol intervals may be calculated as 7 according to the above Formula 1.

In some examples, the value calculated by the terminal using Formula 1 is not an integer value, and may be rounded up or down, which is not limited by the present disclosure.

In another possible implementation, if the base station configures, for the terminal, the number S of consecutive DMRS symbols in each DMRS group, and S is a value greater than or equal to 2, then the terminal side may calculate the number L of symbol intervals by using the following formula:

$$L = (\text{Total number of symbols} * S) / M \quad \text{Formula 2}$$

Assuming that S is 2, each transmission occasion occupies 7 consecutive symbols in time domain, the bundling granularity of DMRS is 4, and M is 6, then L that is calculated using Formula 2 is 9 (rounded down).

In the step 602, within the preset time window; DMRSs are generated based on the maximum number of symbols, where the DMRSs are distributed at intervals according to the number of symbol intervals and satisfy the number of consecutive DMRS symbols in each DMRS group.

In embodiments of the present disclosure, the terminal may place S DMRSs according to the number of symbol intervals within the preset time window. For example, if the maximum number of symbols configured by the base station for the terminal is 6, S is 1 by default, the bundling granularity of DMRS is 4, each transmission occasion occupies 7 consecutive symbols in time domain, and the number of symbol intervals calculated by the terminal is 4, then the pattern of the DMRS generated by the terminal is shown in FIG. 7, where the terminal places 1 DMRS every 5 symbols.

It should be noted that the total number of DMRSs generated by the terminal within the preset time window should be less than or equal to the maximum number of symbols.

In the above embodiments, after the terminal determines the number of symbol intervals between adjacent DMRS groups based on the maximum number of symbols configured by the base station, the total number of symbols included in the preset time window, and the number of consecutive DMRS symbols in each DMRS group, the terminal generates DMRSs at intervals within the preset time window. This can not only reduce the DMRS density to provide more locations for data transmission, but also allow the DMRSs to be distributed as evenly as possible on different physical channel transmission occasions, thereby helping to maintain the power consistency and the phase continuity, and helping to improve the channel estimation performance.

In the second case, the maximum number M of symbols may be agreed in a protocol, and the terminal needs to calculate the number L of symbol intervals.

In this case, the base station does not need to configure the maximum number of symbols for the terminal, and the terminal may directly determine the maximum number of symbols according to the agreement in the protocol. Further, the terminal may determine the number of symbol intervals between adjacent DMRS groups within the preset time window according to the maximum number of symbols agreed in the protocol, the total number of symbols included in the preset time window, and the number of consecutive DMRS symbols in each DMRS group. The way for determining the number of symbol intervals is the same as the above step 601, which will not be described again here.

After determining the number of symbol intervals, the terminal may generate DMRSs distributed at intervals according to the above step 602. The generation method is the same as the above step 602, which will not be described again here.

In the above embodiments, after the terminal determines the maximum number of symbols based on the agreement in the protocol, and determines the number of symbol intervals between adjacent DMRS groups based on the maximum number of symbols, the total number of symbols included in the preset time window, and the number of consecutive DMRS symbols in each DMRS group, the terminal generates DMRSs at intervals within the preset time window. This can not only reduce the DMRS density to provide more locations for data transmission, but also allow the DMRSs to be distributed as evenly as possible on different physical channel transmission occasions, thereby helping to maintain the power consistency and the phase continuity, and helping to improve the channel estimation performance.

In the third case, the maximum number M of symbols may be agreed in a protocol, and the base station determines the number L of symbol intervals and then indicates it to the terminal.

Reference may be made to FIG. 8, which illustrates a flowchart of a method for configuring a DMRS pattern according to an embodiment. The method may be performed by a base station, and may include the following step 801.

In the step 801, a configuration is provided for the terminal about the number of symbol intervals between adjacent DMRS groups when a DMRS is generated within a preset time window; where the preset time window includes a plurality of transmission occasions of a physical channel configured for DMRS bundling.

In the above embodiments, the base station may directly determine the number of symbol intervals and then send it to the terminal, and the terminal generates the DMRSs distributed at intervals based on the number of symbol intervals. This can not only reduce the DMRS density to provide more locations for data transmission, but also allow the DMRSs to be distributed as evenly as possible on different physical channel transmission occasions, thereby helping to maintain the power consistency and the phase continuity, and helping to improve the channel estimation performance.

In some embodiments, reference may be made to FIG. 9, which illustrates a flowchart of a method for configuring a DMRS pattern according to an embodiment. The method may be performed by a base station, and may include the following steps 901 and 902.

In the step 901, based on the total number of symbols included in a preset time window, the maximum number of symbols allowed to be occupied by a DMRS within the preset time window as agreed by a protocol, and the number of consecutive DMRS symbols in each DMRS group, the number of symbol intervals is determined.

In embodiments of the present disclosure, the base station may calculate the number L of symbol intervals according to the above-mentioned Formula 1 or Formula 2. The specific calculation method is the same as that for calculating L in the step 601, which will not be described again here.

In the step 902, the number of symbol intervals is sent through a signaling.

In embodiments of the present disclosure, the signaling includes, but is not limited to, at least one of: a RRC signaling, a MAC CE signaling, and DCI.

In a possible implementation, the base station may send the value of the number of symbol intervals to the terminal by reusing the existing information field of the signaling.

In another possible implementation, the base station may carry the value of the number of symbol intervals through the newly added information field in the signaling, thereby sending the value of the number of symbol intervals to the terminal.

In the above embodiments, the base station may determine the number of symbol intervals based on the maximum number of symbols agreed in the protocol, the total number of symbols included in the preset time window, and the number of consecutive DMRS symbols in each DMRS group, and then send it to the terminal. The terminal directly generates DMRSs distributed at intervals based on the number of symbol intervals. This can not only reduce the DMRS density to provide more locations for data transmission, but also allow the DMRSs to be distributed as evenly as possible on different physical channel transmission occasions, thereby helping to maintain the power consistency and the phase continuity, and helping to improve the channel estimation performance.

In some embodiments, reference may be made to FIG. 10, which illustrates a flowchart of a method for configuring a DMRS pattern according to an embodiment. The method may be performed by a base station, and may include the following steps 1001 and 1002.

In the step 1001, a configuration is provided for the terminal about the number of symbol intervals between adjacent DMRS groups when a DMRS is generated within a preset time window; where the preset time window includes a plurality of transmission occasions of a physical channel configured for DMRS bundling.

In the step 1002, an indication granularity corresponding to the number of symbol intervals is configured for the terminal.

In embodiments of the present disclosure, while configuring, for the terminal, the number of symbol intervals through the signaling, the base station may also configure, for the terminal, the indication granularity corresponding to the number of symbol intervals through the signaling. The indication granularity corresponding to the number of symbol intervals refers to a correspondence between the number of symbol intervals and at least one of the terminal, a terminal service type, a physical channel format, and a preset time window size.

In some examples, the indication granularity corresponding to the number of symbol intervals may include, but is not limited to, at least one of: all terminals in a cell, different terminal groups, a specified terminal, different Physical Uplink Control Channel (PUCCH) formats of the specified terminal, different service types of the specified terminal, and different preset time window sizes of the specified terminal.

For example, if the indication granularity corresponding to the number of symbol intervals refers to different service types of the specified terminal, and the base station configures the number L1 of symbol intervals for the terminal, then L1 is directed to service type 1 of the specified terminal, and the number L2 of symbol intervals corresponding to the service type 2 of the specified terminal may be different from L1. The meanings of other indication granularities are similar to the above examples, and will not be described again here.

In the above embodiments, the base station may also configure the indication granularity corresponding to the number of symbol intervals for the terminal, while configuring the number of symbol intervals for the terminal, which is more conducive to improving the channel estimation performance.

In some embodiments, reference may be made to FIG. 11, which illustrates a flowchart of a method for configuring a DMRS pattern according to an embodiment. The method may be performed by a base station, and may include the following steps 1101 and 1102.

In the step 1101, a configuration is provided for the terminal about the number of symbol intervals between adjacent DMRS groups when a DMRS is generated within a preset time window; where the preset time window includes a plurality of transmission occasions of a physical channel configured for DMRS bundling.

In the step 1102, the number of consecutive DMRS symbols in each DMRS group is configured for the terminal.

In a possible implementation, the base station may also configure, for the terminal, the number S of consecutive DMRS symbols in each DMRS group. The value of S may be a positive integer, such as 1 or 2, or more.

In another possible implementation, the step 1102 may be omitted, and the terminal side defaults that the value of S is 1.

In the above embodiments, the base station may also configure, for the terminal, the number of consecutive DMRS symbols in each DMRS group, while configuring, for the terminal, the number of symbol intervals. If the base station does not configure the number of consecutive DMRS symbols in each DMRS group, the terminal side may use the default value. This also achieves the purpose of distributing the DMRSs as evenly as possible on different physical channel transmission occasions, thereby helping to maintain the power consistency and the phase continuity, and helping to improve the channel estimation performance.

Accordingly, in a case that the base station configures the number of symbol intervals for the terminal, the terminal may generate the DMRS in the following way.

Figures 12, 13A, 13B, 13C, 13D:
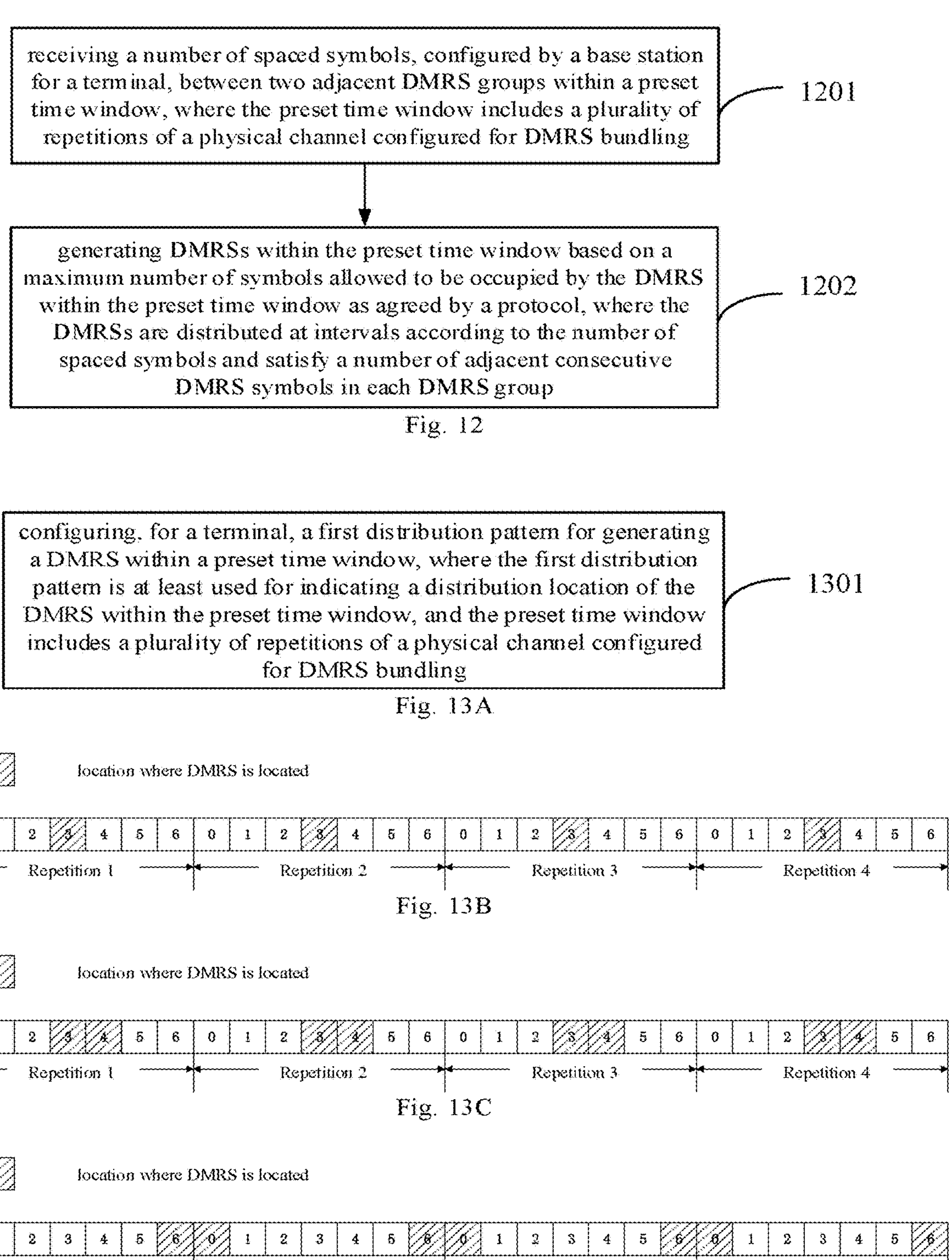
FIG. 12 illustrates a schematic flowchart of another method for generating a DMRS according to an embodiment.
FIG. 13A illustrates a schematic flowchart of another method for configuring a DMRS pattern according to an embodiment.
FIGS. 13B to 13D illustrate schematic diagrams of scenarios for generating a DMRS according to an embodiment.

Reference may be made to FIG. 12, which illustrates a flowchart of a method for generating a DMRS according to an embodiment. The method may be performed by a terminal, and may include the following steps 1201 and 1202.

In the step 1201, the number of symbol intervals, configured by a base station for the terminal, between adjacent DMRS groups within a preset time window is received, where the preset time window includes a plurality of transmission occasions of a physical channel configured for DMRS bundling.

In embodiments of the present disclosure, after the base station determines the number L of symbol intervals, it may directly send the number L to the terminal.

In the step 1202, within the preset time window, DMRSs are generated based on the maximum number of symbols allowed to be occupied by the DMRS within the preset time window as agreed in the protocol, where the DMRSs are distributed at intervals according to the number of symbol intervals and satisfy the number of consecutive DMRS symbols in each DMRS group.

In embodiments of the present disclosure, the number of consecutive DMRS symbols in each DMRS group may be configured by the base station for the terminal, or the terminal determines by default that the number of consecutive DMRS symbols in each DMRS group is 1.

The terminal may generate DMRSs in the preset time window according to the number of symbol intervals sent by the base station, where the DMRSs are distributed at intervals and satisfy the number of consecutive DMRS symbols in each DMRS group, as shown, for example, in FIG. 7. In addition, the total number of DMRSs generated by the terminal within the preset time window is less than or equal to the maximum number of symbols agreed in the protocol.

In the above embodiments, the terminal may generate DMRSs according to the number of symbol intervals configured by the base station, where the DMRSs are distributed at intervals and satisfy the number of consecutive DMRS symbols in each DMRS group. This can not only reduce the DMRS density to provide more locations for data transmission, but also allow the DMRSs to be distributed as evenly as possible on different physical channel transmission occasions, thereby helping to maintain the power consistency and the phase continuity, and helping to improve the channel estimation performance.

In the fourth case, the base station configures the maximum number M of symbols and the number L of symbol intervals for the terminal.

In embodiments of the present disclosure, the base station may configure the maximum number M of symbols for the terminal by using the method for configuring the maximum number of symbols in the first case. In addition, the base station may also configure the number L of symbol intervals for the terminal by using the method for determining the number L of symbol intervals in the third case.

The base station may simultaneously send, to the terminal through the signaling, the maximum number M of symbols and the number L of symbol intervals configured for the terminal.

In a possible implementation, the base station may also configure, for the terminal, an indication granularity corresponding to the maximum number of symbols, and/or configure, for the terminal, an indication granularity corresponding to the number of symbol intervals.

In another possible implementation, the base station may also configure, for the terminal, the number of consecutive DMRS symbols in each DMRS group, or the terminal determines by default that the number of consecutive DMRS symbols in each DMRS group is 1.

The terminal side directly generates DMRSs in the preset time window based on the maximum number L of symbols configured by the base station, where the DMRSs are distributed at intervals according to the number of symbol intervals and satisfy the number of consecutive DMRS symbols in each DMRS group. The number of symbol intervals is also configured by the base station for the terminal. The way in which the terminal generates the DMRS is the same as the way in which the DMRS is generated in the above third case, and will not be described again here.

In the above embodiments, the base station may configure the maximum number of symbols and the number of symbol intervals at the same time. Based on the configuration by the base station, the terminal generates the DMRSs that are distributed at intervals according to the number of symbol intervals and satisfy the number of consecutive DMRS symbols in each DMRS group. This can not only reduce the DMRS density to provide more locations for data transmission, but also allow the DMRSs to be distributed as evenly as possible on different physical channel transmission occasions, thereby helping to maintain the power consistency and the phase continuity, and helping to improve the channel estimation performance.

After the above-mentioned first solution is introduced, the present disclosure further provides a second solution for configuring a DMRS pattern and generating a DMRS.

In the second solution, the maximum number of symbols allowed to be occupied by the DMRS within a defined preset time window is agreed in the protocol or configured by the base station. Respective distribution rules about the locations and the number of DMRSs in each transmission occasion are configured by the base station or agreed in the protocol. The terminal side generates the corresponding DMRS according to the DMRS distribution rules.

In some embodiments, the base station may configure the maximum number of symbols for the terminal. The base station may directly configure, for the terminal, the value corresponding to the maximum number of symbols through the signaling by means of explicit indication. Alternatively, the base station may configure, for the terminal, through the signaling, the association parameter value for determining the value corresponding to the maximum number of symbols, and the terminal determines the value corresponding to the maximum number of symbols based on the association parameter value. The configuration method is the same as the method in which the base station configures the maximum number of symbols for the terminal in the above embodiments, which will not be described again here.

Furthermore, the base station may also configure, for the terminal, the indication granularity corresponding to the maximum number of symbols. In some examples, the indication granularity corresponding to the maximum number of symbols may include, but is not limited to, at least one of: all terminals in a cell, different terminal groups, a specified terminal, different Physical Uplink Control Channel (PUCCH) formats of the specified terminal, different service types of the specified terminal, and different preset time window sizes of the specified terminal.

In embodiments of the present disclosure, the maximum number of symbols may also be directly agreed by the protocol, and the base station needs to configure it for the terminal.

In some embodiments, the base station may configure, for the terminal, a first distribution pattern for generating the DMRS within the preset time window, and the first distribution pattern is at least used for indicating a distribution location of the DMRS within the preset time window.

Reference may be made to FIG. 13A, which illustrates a flowchart of a method for configuring a DMRS pattern according to an embodiment. The method may be performed by a base station, and may include the following step 1301.

In the step 1301, a first distribution pattern for generating the DMRS within a preset time window is configured for a terminal. The first distribution pattern is at least used for indicating a distribution location of the DMRS within the preset time window, and the preset time window includes a plurality of transmission occasions of a physical channel configured for DMRS bundling.

In a possible implementation, first distribution pattern may be used for instructing the terminal to continuously distribute at least one DMRS symbol at a middle location among a plurality of consecutive symbols occupied by each transmission occasion included in the preset time window, as shown for example in FIG. 13B or FIG. 13C.

In another possible implementation, the first distribution pattern may be configured for instructing the terminal to equally distribute at least one DMRS symbol at a starting location and an ending location among the plurality of consecutive symbols occupied by each transmission occasion included in the preset time window, such as shown in FIG. 13D.

In the above embodiments, the base station may configure, for the terminal, the first distribution pattern for generating the DMRS within the preset time window, so that the terminal generates the DMRS according to the first distribution pattern. This can not only reduce the DMRS density to provide more locations for data transmission, but also allow the DMRSs to be distributed as evenly as possible on different physical channel transmission occasions, thereby helping to maintain the power consistency and the phase continuity, and helping to improve the channel estimation performance.

In some embodiments, the base station may send, to the terminal through a signaling, a first bit value used for indicating the first distribution rule. For example, when the first bit value is 1, it is used for instructing the terminal to continuously distribute at least one DMRS symbol at the middle location among the plurality of consecutive symbols occupied by each transmission occasion included in the preset time window. When the first bit value is 0, it is used for instructing the terminal to equally distribute at least one DMRS symbol at the starting location and the ending location among the plurality of consecutive symbols occupied by each transmission occasion included in the preset time window The signaling includes, but is not limited to, at least one of: a RRC signaling, a MAC CE signaling, and DCI.

In the above embodiments, in a case that the base station configures the first distribution pattern for the terminal, the base station may send, to the terminal through the signaling, the first bit value used for indicating the first distribution rule, which is simple to implement and has high availability.

In some embodiments, the first distribution pattern may also be directly agreed by the protocol, without configuration by the base station for the terminal.

In some embodiments, the base station may also configure, for the terminal, a second distribution pattern for generating, within the preset time window, remaining DMRS symbols to be distributed.

Reference may be made to FIG. 14, which illustrates a flowchart of a method for configuring a DMRS pattern according to an embodiment. The method may be performed by a base station, and may include the following steps 1401 and 1402.

In the step 1401, a first distribution pattern for generating the DMRS within a preset time window is configured for a terminal. The first distribution pattern is at least used for indicating a distribution location of the DMRS within the preset time window, and the preset time window includes a plurality of transmission occasions of a physical channel configured for DMRS bundling.

In the step 1402, a second distribution pattern is configured for the terminal for generating, within the preset time window, remaining DMRS symbols to be distributed.

In a possible implementation, the second distribution pattern is used for instructing the terminal to sequentially and individually distribute the remaining DMRS symbols to be distributed within a plurality of consecutive time symbols occupied by even-numbered transmission occasions in the preset time window. For example, after the terminal side generates the DMRS according to the first distribution pattern, there are still two remaining DMRS symbols to be distributed. Then, the remaining DMRSs to be distributed may be placed at the second and fourth transmission occasions according to the second distribution pattern, as shown in FIG. 15A.

In another possible implementation, the second distribution pattern is used for instructing the terminal to sequentially and individually distribute the remaining DMRS symbols to be distributed within a plurality of consecutive time symbols occupied by odd-numbered transmission occasions in the preset time window. For example, after the terminal side generates the DMRS according to the first distribution pattern, there are still two remaining DMRS symbols to be distributed. Then, the remaining DMRSs to be distributed may be placed at the first and third transmission occasions according to the second distribution pattern, as shown in FIG. 15B.

In the above embodiments, it is possible to avoid sequentially and individually distributing the remaining DMRS symbols to be distributed in the first N transmission occasions, and to allow the DMRSs to be distributed as evenly as possible on different physical channel transmission occasions. This facilities to maintain the power consistency and the phase continuity, and facilities to improve the channel estimation performance.

In some embodiments, the base station may send, to the terminal through a signaling, a second bit value used for indicating the second distribution pattern. For example, when the second bit value is 1, it is used for instructing the terminal to sequentially and individually distribute the remaining DMRS symbols to be distributed within the plurality of consecutive time symbols occupied by the even-numbered transmission occasions in the preset time window. When the second bit value is 0, it is used for instructing the terminal to sequentially and individually distribute the remaining DMRS symbols to be distributed within a plurality of consecutive time symbols occupied by the odd-numbered transmission occasions in the preset time window. Vice versa.

The signaling includes, but is not limited to, at least one of: a RRC signaling, a MAC CE signaling, and DCI.

In the above embodiments, in a case that the base station configures the second distribution pattern for the terminal, the base station may send, to the terminal through the signaling, the second bit value used for indicating the second distribution rule, which is simple to implement and has high availability.

In some embodiments, the second distribution pattern may also be directly agreed by the protocol, without configuration by the base station for the terminal.

In some embodiments, in a case that the base station configures, for the terminal, the maximum number of symbols, the first distribution pattern, and the second distribution pattern, less signaling may be used to simultaneously indicate the maximum number of symbols, the first distribution pattern, and the second distribution pattern.

In a possible implementation, the base station may send a third bit value with a target number of bits through the signaling, and the third bit value with the target number of bits is used for simultaneously indicating the first distribution pattern, the second distribution pattern, and the maximum number of symbols.

In some examples, the target number may be a positive integer, such as 3. Assuming that the third bit value with three bits is 100, the highest bit set to be a bit value of 1 may be used for indicating to the terminal that the maximum number of symbols is 8, the first distribution pattern indicates that the at least one DMRS symbol is continuously distributed at the middle location among the plurality of consecutive symbols occupied by each transmission occasion included in the preset time window, and the second distribution pattern indicates that the remaining DMRS symbols to be distributed are sequentially and individually distributed within the plurality of consecutive time symbols occupied by the even-numbered transmission occasions in the preset time window.

The above is only an illustrative description, and the way for simultaneously indicating at least two of: the maximum number of symbols, the first distribution pattern, and the second distribution pattern, through a smaller number of bit values should fall within the protection scope of the present disclosure.

In the above embodiments, in a case that the base station configures a lot of contents for the terminal, a smaller number of bit values may be used for indicating at least two of: the maximum number of symbols, the first distribution pattern, and the second distribution pattern, which saves the signaling resources of the base station and has high availability.

In view of the above solution for configuring a DMRS pattern, the present disclosure further provides a corresponding solution for generating a DMRS.

Reference may be made to FIG. 16, which illustrates a flowchart of a method for generating a DMRS according to an embodiment. The method may be performed by a terminal, and may include the following step 1601.

In the step 1601, based on the maximum number of symbols allowed to be occupied by the DMRS within a preset time window, and a first distribution pattern for generating the DMRS within the preset time window, the DMRS conforming to the first distribution pattern is generated within the preset time window.

The first distribution pattern is at least used for indicating a distribution location of the DMRS within the preset time window, and the preset time window includes a plurality of transmission occasions of a physical channel configured for DMRS bundling. When the terminal generates the DMRS conforming to the first distribution pattern, the number of symbols occupied by the DMRS is less than or equal to the maximum number of symbols.

In the above embodiments, the terminal enables the generated DMRSs to be evenly distributed on different physical channel transmission occasions as much as possible based on the maximum number of symbols and the first distribution pattern for generating the DMRS within the preset time window. This facilities to maintain the power consistency and the phase continuity, and facilities to improve the channel estimation performance.

In some embodiments, the terminal may receive the maximum number of symbols configured by the base station for the terminal. Specifically, the terminal may directly receive the value corresponding to the maximum number of symbols configured by the base station for the terminal, or the terminal may determine the value corresponding to the maximum number of symbols based on the association parameter value configured by the base station for the terminal. The association parameter value includes, but is not limited to, at least one of: the number of a plurality of transmission occasions included in the preset time window, the total number of symbols included in the preset time window, and the total number of slots included in the preset time window.

Alternatively, the terminal may directly determine the maximum number of symbols based on the protocol agreement.

In some embodiments, the terminal may determine the first distribution pattern based on the received first bit value. For example, when the first bit value is 1, the terminal determines the first distribution pattern as indicating that at least one DMRS symbol is continuously distributed at the middle location among the plurality of consecutive symbols occupied by each transmission occasion included in the preset time window. When the first bit value is 0, the terminal determines the first distribution pattern as indicating that at least one DMRS symbol is equally distributed at a starting location and an ending location of the plurality of consecutive symbols occupied by each transmission occasion included in the preset time window. Vice versa.

Alternatively, the terminal may directly determine the first distribution pattern based on the protocol agreement.

Figures 17, 18, 19, 20:
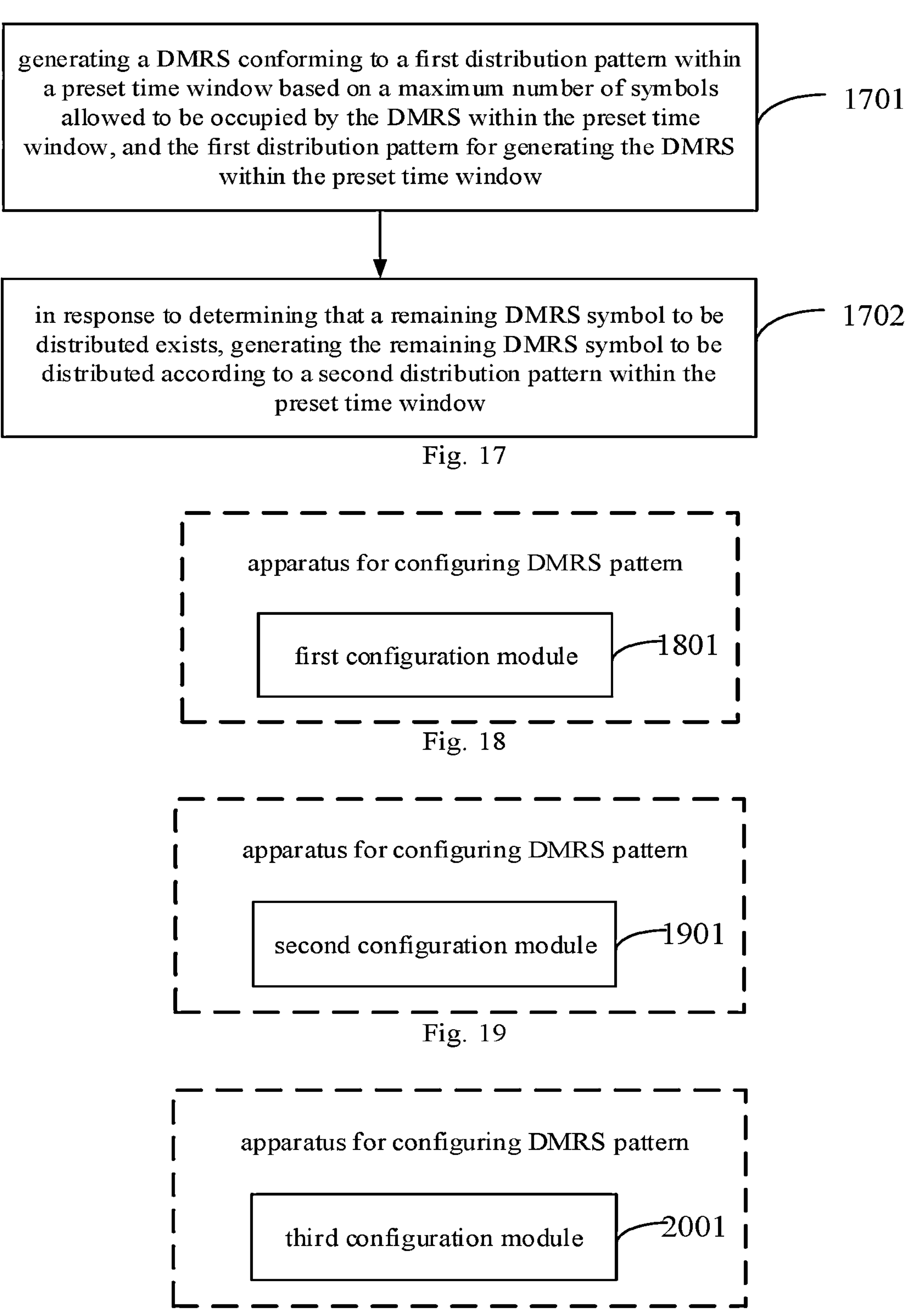
FIG. 17 illustrates a schematic flowchart of another method for generating a DMRS according to an embodiment.
FIG. 18 illustrates a block diagram of an apparatus for configuring a DMRS pattern according to an embodiment.
FIG. 19 illustrates a block diagram of another apparatus for configuring a DMRS pattern according to an embodiment.
FIG. 20 illustrates a block diagram of another apparatus for configuring a DMRS pattern according to an embodiment.

In some embodiments, reference may be made to FIG. 17, which illustrates a flowchart of a method for generating a DMRS according to an embodiment. The method may be performed by a terminal, and may include the following steps 1701 and 1702.

In the step 1701, based on the maximum number of symbols allowed to be occupied by the DMRS within a preset time window, and a first distribution pattern for generating the DMRS within the preset time window; the DMRS conforming to the first distribution pattern is generated within the preset time window.

The first distribution pattern is at least used for indicating a distribution location of the DMRS within the preset time window, and the preset time window includes a plurality of transmission occasions of a physical channel configured for DMRS bundling.

In the step 1702, in response to determining that remaining DMRS symbols to be distributed exist, the remaining DMRS symbols to be distributed are generated according to the second distribution pattern within the preset time window.

For example, if the maximum number of symbols is 6, after the DMRSs are generated according to the first distribution pattern at the middle location among the plurality of consecutive symbols occupied by 4 transmission occasions, there are still 2 remaining DMRSs to be distributed.

In a possible implementation, the terminal may determine the second distribution pattern based on the received second bit value. For example, when the second bit value is 1, the terminal determines the second distribution pattern as indicating that the remaining DMRS symbols to be distributed are sequentially and individually distributed within the plurality of consecutive time symbols occupied by the even-numbered transmission occasions in the preset time window: When the second bit value is 0), the terminal determines the second distribution pattern as indicating that the remaining DMRS symbols to be distributed are sequentially and individually distributed within the plurality of consecutive time symbols occupied by the odd-numbered transmission occasions in the preset time window. Vice versa.

In the above embodiments, not only the DMRS density can be reduced to provide more locations for data transmission, but also the DMRSs can be distributed as evenly as possible on different physical channel transmission occasions. This facilitates to maintain the power consistency and the phase continuity, and facilitates to improve the channel estimation performance.

In some embodiments, based on a correspondence between a bit value with a target number of bits and the first distribution pattern, the second distribution pattern, the maximum number of symbols, the terminal may determine the first distribution pattern, the second distribution pattern, and the maximum number of symbols corresponding to the received third bit value with the target number of bits.

For example, the terminal receives a third bit value 100 with three bits. According to the above correspondence, when the terminal determines that the highest bit is 1, it indicates that the maximum number of symbols is 8, the first distribution pattern indicates that at least one DMRS symbol is continuously distributed at the middle location among the plurality of consecutive symbols occupied by each transmission occasion included in the preset time window, and the second distribution pattern indicates that the remaining DMRS symbols to be distributed are sequentially and individually distributed within the plurality of consecutive time symbols occupied by the even-numbered transmission occasions in the preset time window.

In the above embodiments, the terminal may quickly determine the maximum number of symbols, the first distribution pattern, and the second distribution pattern configured by the base station for the terminal, based on the received small number of third bit values, which is simple to implement and has high availability.

Corresponding to the foregoing method embodiments for application function implementation, the present disclosure further provides apparatus embodiments for application function implementation.

Reference may be made to FIG. 18, which illustrates a block diagram of an apparatus for configuring a DMRS pattern according to an embodiment. The apparatus is used in a base station, and includes: a first configuration module 1801.

The first configuration module 1801 is configured to configure, for a terminal, a maximum number of symbols allowed to be occupied by a DMRS within a preset time window, where the preset time window includes a plurality of transmission occasions of a physical channel configured for DMRS bundling.

Reference may be made to FIG. 19, which illustrates a block diagram of an apparatus for configuring a DMRS pattern according to an embodiment. The apparatus is used in a base station, and includes: a second configuration module 1901.

The second configuration module 1901 is configured to configure, for a terminal, a number of symbol intervals between adjacent DMRS groups when a DMRS is generated within a preset time window, where the preset time window includes a plurality of transmission occasions of a physical channel configured for DMRS bundling.

Reference may be made to FIG. 20, which illustrates a block diagram of an apparatus for configuring a DMRS pattern according to an embodiment. The apparatus is used in a base station, and includes: a third configuration module 2001.

The third configuration module 2001 is configured to: configure, for a terminal, a maximum number of symbols allowed to be occupied by a DMRS within a preset time window: and configure, for the terminal, a number of symbol intervals between adjacent DMRS groups when the DMRS is generated within the preset time window, where the preset time window includes a plurality of transmission occasions of a physical channel configured for DMRS bundling.

Figures 21, 22, 23, 24:
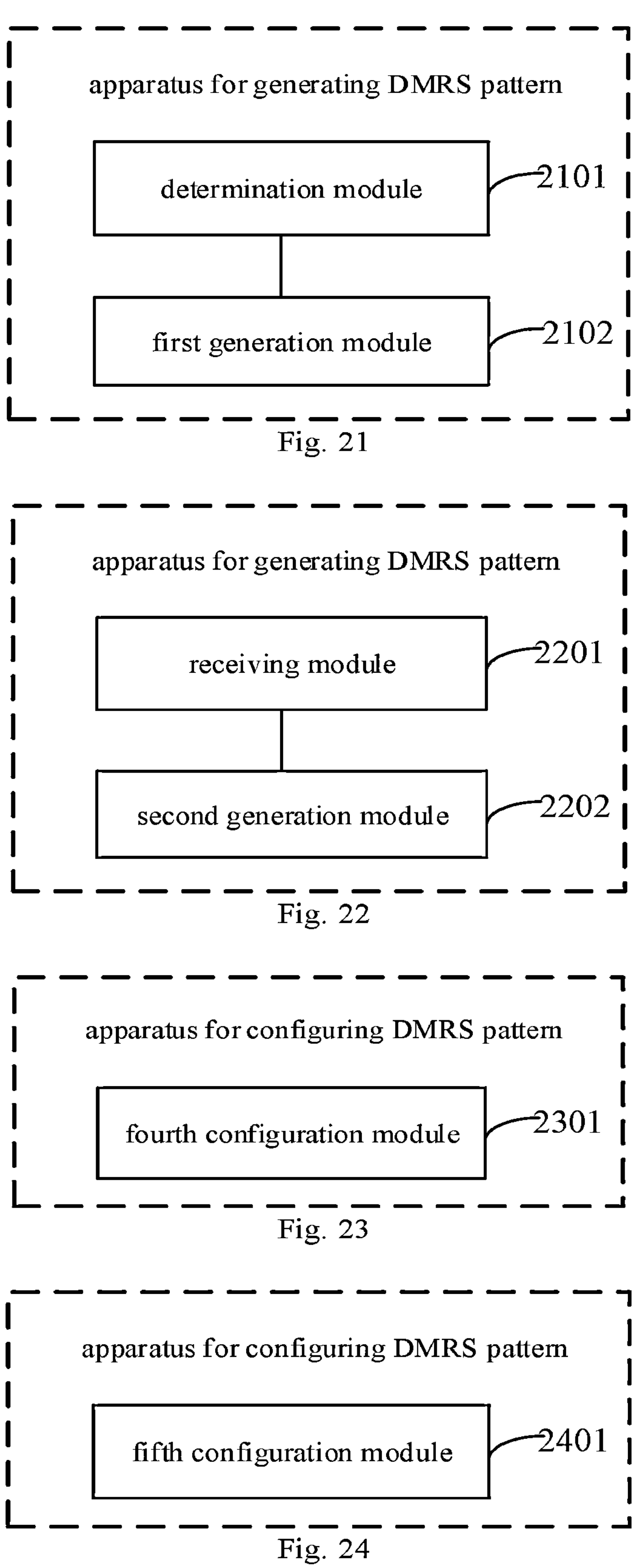
FIG. 21 illustrates a block diagram of an apparatus for generating a DMRS according to an embodiment.
FIG. 22 illustrates a block diagram of another apparatus for generating a DMRS according to an embodiment.
FIG. 23 illustrates a block diagram of another apparatus for configuring a DMRS pattern according to an embodiment.
FIG. 24 illustrates a block diagram of another apparatus for configuring a DMRS pattern according to an embodiment.

Reference may be made to FIG. 21, which illustrates a block diagram of an apparatus for generating a DMRS according to an embodiment. The apparatus is used in a terminal, and includes: a determination module 2101 and a first generation module 2102.

The determination module 2101 is configured to determine a number of symbol intervals between adjacent DMRS groups within a preset time window, based on a maximum number of symbols allowed to be occupied by the DMRS within the preset time window, a total number of symbols included in the preset time window; and a number of consecutive DMRS symbols in each DMRS group, where the preset time window includes a plurality of transmission occasions of a physical channel configured for DMRS bundling.

The first generation module 2102 is configured to generate, within the preset time window. DMRSs that are distributed at intervals according to the number of symbol intervals and satisfy the number of consecutive DMRS symbols in each DMRS group.

Reference may be made to FIG. 22, which illustrates a block diagram of an apparatus for generating a DMRS according to an embodiment. The apparatus is used in a terminal, and includes: a receiving module 2201 and a second generation module 2202.

The receiving module 2201 is configured to receive a number of symbol intervals, configured by a base station for the terminal, between adjacent DMRS groups within a preset time window, where the preset time window includes a plurality of transmission occasions of a physical channel configured for DMRS bundling.

The second generation module 2202 is configured to generate, within the preset time window. DMRSs that are distributed at intervals according to the number of symbol intervals and satisfy a number of consecutive DMRS symbols in each DMRS group.

Reference may be made to FIG. 23, which illustrates a block diagram of an apparatus for configuring a DMRS pattern according to an embodiment. The apparatus is used in a base station, and includes: a fourth configuration module 2301.

The fourth configuration module 2301 is configured to configure, for a terminal, a first distribution pattern for generating a DMRS within a preset time window, where the first distribution pattern is at least used for indicating a distribution location of the DMRS within the preset time window, and the preset time window includes a plurality of transmission occasions of a physical channel configured for DMRS bundling.

Reference may be made to FIG. 24, which illustrates a block diagram of an apparatus for configuring a DMRS pattern according to an embodiment. The apparatus is used in a base station, and includes: a fifth configuration module 2401.

The fifth configuration module 2401 is configured to configure, for a terminal, a maximum number of symbols allowed to be occupied by a DMRS within a preset time window, where the preset time window includes a plurality of transmission occasions of a physical channel configured for DMRS bundling.

Figures 25, 26:
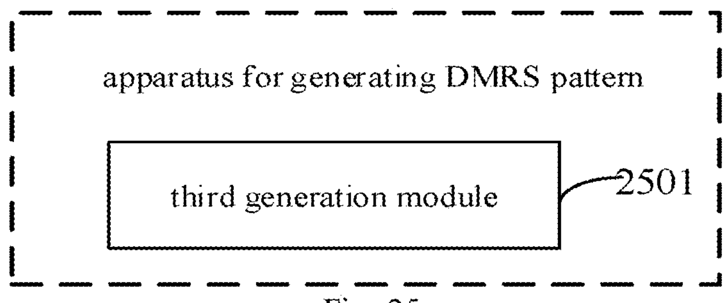
FIG. 25 illustrates a block diagram of another apparatus for generating a DMRS according to an embodiment.
FIG. 26 illustrates a schematic structural diagram of an apparatus for configuring a DMRS pattern according to an embodiment of the present disclosure.

Reference may be made to FIG. 25, which illustrates a block diagram of an apparatus for generating a DMRS according to an embodiment. The apparatus is used in a terminal, and includes: a third generation module 2501.

The third generation module 2501 is configured to generate the DMRS conforming to the first distribution pattern within the preset time window, based on a maximum number of symbols allowed to be occupied by the DMRS within the preset time window, and a first distribution pattern for generating the DMRS within the preset time window. The first distribution pattern is at least used for indicating a distribution location of the DMRS within the preset time window, and the preset time window includes a plurality of transmission occasions of a physical channel configured for DMRS bundling.

For the apparatus embodiments, since they basically correspond to the method embodiments, the description of the method embodiments may be referred to for understanding the relevant parts of the apparatus embodiments. The apparatus embodiments described above are only illustrative. The units described as separated parts may or may not be physically separated, and the parts shown as units may or may not be physical units. That is, the units may be located in one place, or may be distributed over a plurality of network units. Some or all of the modules may be selected according to actual needs to achieve the objectives of the solutions of the present disclosure. Those of ordinary skill in the art can understand and implement the present disclosure without paying creative labor.

Accordingly, the present disclosure further provides a computer-readable storage medium having a computer program stored thereon, and the computer program is configured to perform any method for configuring a DMRS pattern at the base station side.

Accordingly, the present disclosure further provides a computer-readable storage medium having a computer program stored thereon, and the computer program is configured to perform any method for generating a DMRS at the terminal side.

Accordingly, the present disclosure further provides an apparatus for configuring a DMRS pattern, including a processor and a memory configured to store instructions executable by the processor.

The processor is configured to perform any method for configuring a DMRS pattern at the base station side.

As shown in FIG. 26, FIG. 26 is a schematic structural diagram of an apparatus 2600 for configuring a DMRS pattern according to an embodiment of the present disclosure. The apparatus 2600 may be provided as a base station. Referring to FIG. 26, the apparatus 2600 includes a processing component 2622, a wireless transmitting/receiving component 2624, an antenna component 2626, and a signal processing part specific to a wireless interface. The processing component 2622 may further include one or more processors.

One of the processors in the processing component 2622 may be configured to perform any method for configuring a DMRS pattern at the base station side.

Accordingly, the present disclosure further provides an apparatus for generating a DMRS pattern, including a processor and a memory configured to store instructions executable by the processor.

The processor is configured to execute any method for generating a DMRS pattern at the terminal side.

Figure 27:
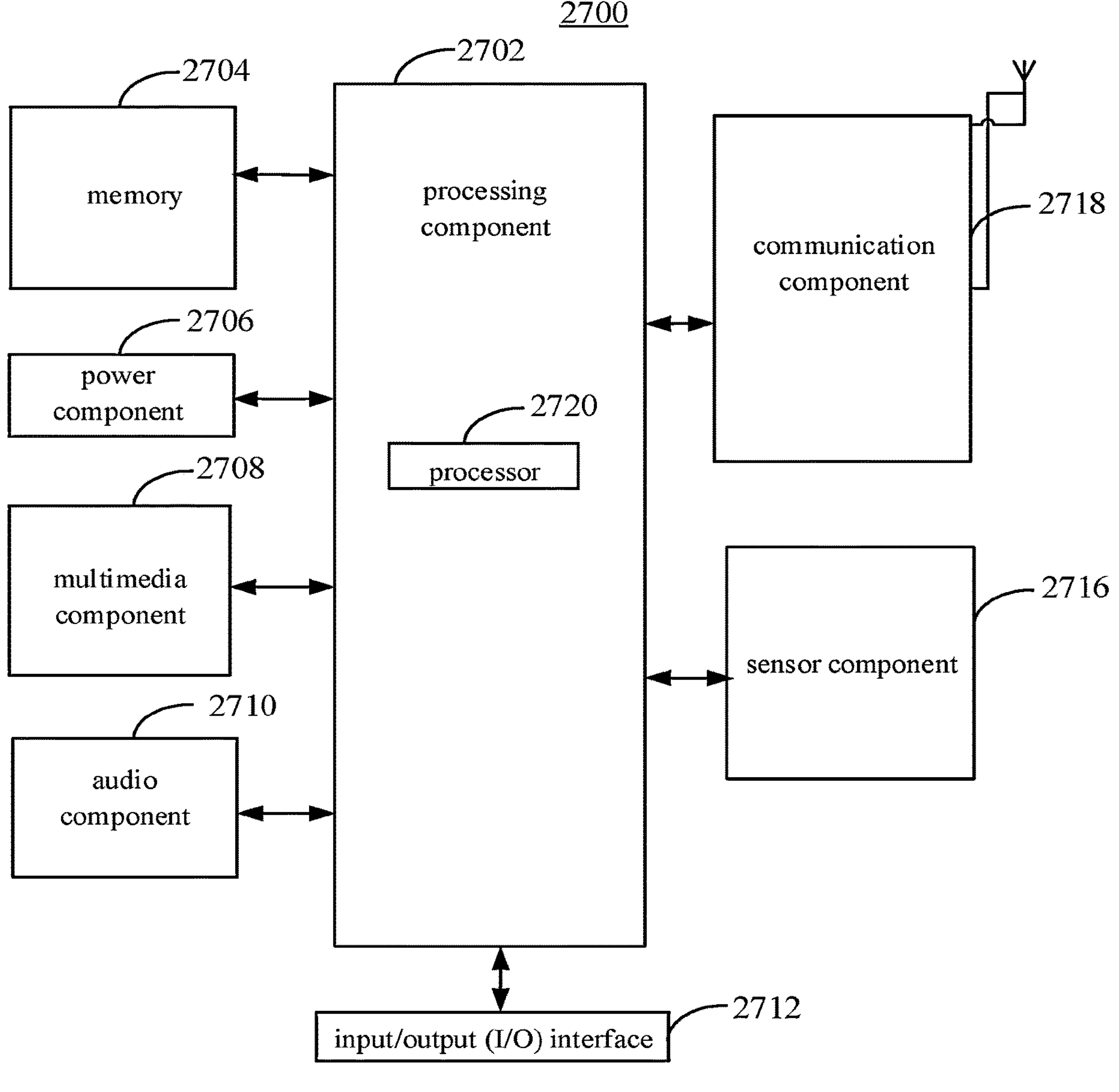
FIG. 27 illustrates a schematic structural diagram of an apparatus for generating a DMRS according to an embodiment of the present disclosure.

FIG. 27 is a block diagram showing an electronic device 2700 according to an embodiment of the present disclosure. For example, the electronic device 2700 may be a mobile phone, a tablet computer, an e-book reader, a multimedia player device, a wearable device, a vehicle-mounted terminal, an iPad, a smart TV, and other terminals.

Referring to FIG. 27, the electronic device 2700 may include one or more of the following components a processing component 2702, a memory 2704, a power component 2706, a multimedia component 2708, an audio component 2710, an input/output (I/O) interface 2712, a sensor component 2716, and a communication component 2718.

The processing component 2702 typically controls overall operations of the electronic device 2700, such as operations associated with display, telephone call, data communication, camera operation, and recording operation. The processing component 2702 may include one or more processors 2720 to execute instructions, so as to perform all or part of the steps in the method for generating a DMRS as described above. Moreover, the processing component 2702 may include one or more modules which facilitate interactions between the processing component 2702 and other components. For instance, the processing component 2702 may include a multimedia module to facilitate interactions between the multimedia component 2708 and the processing component 2702. For another example, the processing component 2702 may read the executable instructions from the memory to implement steps of the method for generating a DMRS provided by the above various embodiments.

The memory 2704 is configured to store various types of data to support operations of the electronic device 2700. Examples of such data include instructions for any applications or methods operated on the electronic device 2700, contact data, phonebook data, messages, pictures, video, etc. The memory 2704 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 2706 provides power to various components of the electronic device 2700. The power component 2706 may include a power management system, one or more power sources, and other components associated with the generation, management, and distribution of power in the electronic device 2700.

The multimedia component 2708 includes a display screen providing an output interface between the electronic device 2700 and the user. In some embodiments, the multimedia component 2708 includes a front camera and/or a rear camera. The front camera and/or the rear camera may receive an external multimedia datum while the electronic device 2700 is in an operation mode, such as a photographing mode or a video mode. Each of the front camera and the rear camera may be a fixed optical lens system or have focus and optical zooming capability.

The audio component 2710 is configured to output and/or input audio signals. For example, the audio component 2710) includes a microphone ("MIC") configured to receive an external audio signal when the electronic device 2700 is in an operation mode, such as a call mode, a recording mode, and a voice recognition mode. The received audio signal may be further stored in the memory 2704 or transmitted via the communication component 2718. In some embodiments, the audio component 2710 further includes a speaker to output audio signals.

The I/O interface 2712 provides an interface between the processing component 2702 and peripheral interface modules, such as a keyboard, a click wheel, buttons, and the like. The buttons may include, but are not limited to, a home button, a volume button, a starting button, and a locking button.

The sensor component 2716 includes one or more sensors to provide status assessments about various aspects of the electronic device 2700. For instance, the sensor component 2716 may detect an open/closed status of the electronic device 2700, relative locating among components, e.g., the display and the keypad, of the electronic device 2700, a change in location of the electronic device 2700 or a component of the electronic device 2700, a presence or absence of user contact with the electronic device 2700, an orientation or an acceleration/deceleration of the electronic device 2700, and a change in temperature of the electronic device 2700. The sensor component 2716 may include a proximity sensor, configured to detect the presence of nearby objects without any physical contact. The sensor component 2716 may further include a light sensor, such as a CMOS or CCD image sensor, for use in imaging applications. In some embodiments the sensor component 2716 may further include an accelerometer sensor, a gyroscope sensor, a magnetic sensor, a pressure sensor, or a temperature sensor.

The communication component 2718 is configured to facilitate the wired or wireless communication between the electronic device 2700) and other devices. The electronic device 2700 may access a wireless network based on any communication standard, such as WiFi. 2G. 3G. 4G. 5G, 6G. or a combination thereof. In one example embodiment, the communication component 2718 receives a broadcast signal or broadcast associated information from an external broadcast management system via a broadcast channel. In one example embodiment, the communication component 2718 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In embodiments of the present disclosure, the electronic device 2700 may be implemented with one or more application specific integrated circuits (ASIC), digital signal processors (DSP), digital signal processing devices (DSPD), programmable logic devices (PLD), field programmable gate arrays (FPGA), controllers, micro-controllers, microprocessors, or other electronic components, for performing the method for generating a DMRS described above.

In embodiments of the present disclosure, there is further provided a non-transitory machine readable storage medium including instructions, such as the memory 2704 including instructions, and the instructions are executable by the processor 2720 in the electronic device 2700 to perform the method for generating a DMRS described above. For example, the non-transitory computer readable storage medium may be a ROM, a RAM, a CD-ROM, a magnetic tape, a floppy disc, an optical data storage device, and the like.

Other implementations of embodiments of the present disclosure will be apparent to those skilled in the art from consideration of the specification and practice of the present disclosure disclosed herein. The present disclosure is intended to cover any variations, uses, or adaptations embodiments of the present disclosure, which are in accordance with the general principles of the present disclosure and include common general knowledge or conventional technical means in the art that are not disclosed in the present disclosure. The specification and embodiments are illustrative, and the real scope and spirit of the present disclosure is defined by the appended claims.

It should be understood that embodiments of the present disclosure are not limited to the precise structures that have been described above and shown in the drawings, and various modifications and changes may be made without departing from the scope thereof. The scope of the present disclosure is limited only by the appended claims.

What is claimed is:

1. A method for configuring a Demodulation Reference Signal (DMRS) pattern, performed by a base station, and comprising:

configuring, for a terminal, a number of symbol intervals between adjacent DMRS groups when a DMRS is generated within a preset time window, wherein the preset time window comprises a plurality of transmission occasions of a physical channel configured for DMRS bundling.

2. The method according to claim 1, further comprising: configuring, for the terminal, a maximum number of symbols allowed to be occupied by the DMRS within the preset time window, wherein, the configuring, for the terminal, the maximum number of symbols allowed to be occupied by the DMRS within the preset time window, comprises any of:

configuring, through a signaling for the terminal, a value corresponding to the maximum number of symbols; or configuring, through the signaling for the terminal, an association parameter value for determining the value corresponding to the maximum number of symbols.

3. The method according to claim 1, further comprising:

configuring, for the terminal, an indication granularity corresponding to the maximum number of symbols; and/or configuring, for the terminal, an indication granularity corresponding to the number of symbol intervals.

4. The method according to claim 1, further comprising: configuring, for the terminal, a number of consecutive DMRS symbols in each DMRS group within the preset time window.

5. The method according to claim 1, wherein, the configuring, for the terminal, the number of symbol intervals between the adjacent DMRS groups when the DMRS is generated within the preset time window, comprises:

determining the number of symbol intervals based on a total number of symbols comprised in the preset time window, the maximum number of symbols allowed to be occupied by the DMRS within the preset time window, and a number of consecutive DMRS symbols in each DMRS group; and sending the number of symbol intervals through a signaling.

6. A method for generating a Demodulation Reference Signal (DMRS), performed by a terminal, and comprising:

generating DMRSs within a preset time window based on a maximum number of symbols allowed to be occupied by the DMRS within the preset time window, wherein the DMRSs are distributed at intervals according to a number of symbol intervals between adjacent DMRS groups within the preset time window and satisfy a number of consecutive DMRS symbols in each DMRS group, wherein the number of symbol intervals between adjacent DMRS groups within the preset time window is determined based on the maximum number of symbols allowed to be occupied by the DMRS within the preset time window, a total number of symbols comprised in the preset time window, and the number of consecutive DMRS symbols in each DMRS group, or is configured by a base station for the terminal; and the preset time window comprises a plurality of transmission occasions of a physical channel configured for DMRS bundling.

7. The method according to claim 6, further comprising any of:

receiving the maximum number of symbols configured by the base station for the terminal; or determining the maximum number of symbols based on a protocol agreement.

8. The method according to claim 7, wherein, the receiving the maximum number of symbols configured by the base station for the terminal, comprises any of:

receiving a value corresponding to the maximum number of symbols configured by the base station for the terminal; or determining the value corresponding to the maximum number of symbols based on an association parameter value configured by the base station for the terminal.

9. The method according to claim 6, further comprising any of:

receiving the number of consecutive DMRS symbols in each DMRS group configured by the base station for the terminal; or determining the number of consecutive DMRS symbols in each DMRS group to be 1.

10. The method according to claim 1, further comprising at least one of:

configuring, for the terminal, a first distribution pattern for generating the DMRS within the preset time window, wherein the first distribution pattern is at least used for indicating a distribution location of the DMRS within the preset time window; and/or configuring, for the terminal, a second distribution pattern for generating within the preset time window a remaining DMRS symbol to be distributed.

11. An apparatus for configuring a Demodulation Reference Signal (DMRS) pattern, comprising:

a processor; and a memory, configured to store instructions executable by the processor, wherein the processor is configured to perform a method for configuring a DMRS pattern, comprising:

configuring, for a terminal, a number of symbol intervals between adjacent DMRS groups when a DMRS is generated within a preset time window, wherein the preset time window comprises a plurality of transmission occasions of a physical channel configured for DMRS bundling.

12. An apparatus for generating a Demodulation Reference Signal (DMRS), comprising:

a processor; and a memory, configured to store instructions executable by the processor, wherein the processor is configured to perform the method for generating a DMRS according to claim 6.

13. The apparatus according to claim 11, wherein, the configuring, for the terminal, the maximum number of symbols allowed to be occupied by the DMRS within the preset time window, comprises any of:

configuring, through a signaling for the terminal, a value corresponding to the maximum number of symbols; or configuring, through the signaling for the terminal, an association parameter value for determining the value corresponding to the maximum number of symbols.

14. The apparatus according to claim 11, wherein the method further comprises:

configuring, for the terminal, an indication granularity corresponding to the maximum number of symbols; and/or configuring, for the terminal, an indication granularity corresponding to the number of symbol intervals.

15. The apparatus according to claim 11, wherein the method further comprises:

configuring, for the terminal, a number of consecutive DMRS symbols in each DMRS group within the preset time window.

16. The apparatus according to claim 11, wherein, the configuring, for the terminal, the number of symbol intervals between the adjacent DMRS groups when the DMRS is generated within the preset time window, comprises:

determining the number of symbol intervals based on a total number of symbols comprised in the preset time window, the maximum number of symbols allowed to be occupied by the DMRS within the preset time window, and a number of consecutive DMRS symbols in each DMRS group; and sending the number of symbol intervals through a signaling.

17. The apparatus according to claim 11, wherein the method further comprises at least one of:

configuring, for the terminal, a first distribution pattern for generating the DMRS within the preset time window, wherein the first distribution pattern is at least used for indicating a distribution location of the DMRS within the preset time window; and/or configuring, for the terminal, a second distribution pattern for generating within the preset time window a remaining DMRS symbol to be distributed.

* * * * *